United States Patent [19]

Carus, III et al.

[11] Patent Number: 5,660,712
[45] Date of Patent: Aug. 26, 1997

[54] ELECTROLYTIC PRODUCTION OF POTASSIUM PERMANGANATE USING A CATIONIC MEMBRANE IN AN ELECTROLYTIC CELL

[76] Inventors: Paul Carus, III, 2965 E. 419th Rd., Burnham Woods, La Salle, Ill. 61301; Horst Adolf, 916 E. Cleveland St. Box 219, Ladd, Ill. 61329; Paul Carus, II, 2215 Twin Oak Rd., Peru, Ill. 61354

[21] Appl. No.: 477,092

[22] Filed: Jun. 7, 1995

[51] Int. Cl.⁶ .................................................. C25B 1/28
[52] U.S. Cl. ........................................................ 205/476
[58] Field of Search ................................... 205/476, 475

[56] References Cited

U.S. PATENT DOCUMENTS

| | | | |
|---|---|---|---|
| 2,504,129 | 4/1950 | Jaskowiak | 423/599 |
| 2,504,130 | 4/1950 | Jaskowiak | 423/599 |
| 2,504,131 | 4/1950 | Jaskowiak | 423/599 |
| 2,843,537 | 7/1958 | Carus | 205/476 |
| 2,908,620 | 10/1959 | Carus | 205/476 |
| 2,940,821 | 6/1960 | Carus et al. | 423/599 |
| 2,940,822 | 6/1960 | Carus et al. | 423/599 |
| 2,940,823 | 6/1960 | Reidies et al. | 423/599 |
| 3,062,734 | 11/1962 | Carus | 204/270 |
| 3,172,830 | 3/1965 | Carus | 205/476 |
| 3,412,006 | 11/1968 | Alexander et al. | 204/630 |
| 4,085,191 | 4/1978 | Mein et al. | 423/208 |
| 4,859,300 | 8/1989 | Sullivan et al. | 204/164 |
| 4,911,802 | 3/1990 | D'Ambrisi | 205/475 |

FOREIGN PATENT DOCUMENTS

| | | |
|---|---|---|
| 2063619 | 9/1992 | Canada . |
| 291445 | 11/1988 | European Pat. Off. . |
| 396252 | 11/1990 | European Pat. Off. . |
| 2850564 | 6/1980 | Germany . |
| WO89/06639 | 7/1989 | WIPO . |

OTHER PUBLICATIONS

Bogenschutz et al., Regenerierverfahren fur Atzlosungen in der Leiterplattenfertigung, Galvanotechnik D 7968 Saulgau 70 (1979) Nr. 9.

George et al., Regeneration of Waste Chromic Acid Etching Solutions in an Industrial–Scale Research Unit.

Gross et al., Cathodic Compartment for the Electrolytic Regeneration of Chromic Acid Using Sulfuric Acid and Phosphoric Acid Solutions, Chem. Abst. 89:137643u (1978).

Hayashi et al., Electrolysis Technique for Treatment of Chrome Etching Wastewater, Chem. Abst. 90:72982c (1979).

Heger et al., Processing of Chromic Acid Etching Baths. Process Engineering Studies on Recycling Chromic Acid–Containing Etching Baths Using Solid Bed Electrolysis, Chem. Abst. 99:8727g (1983).

Kirk–Othmer, *Encyclopedia of Chemical Technology*, 3rd Ed. Suppl. vol., pp. 569–572 (1984).

*Primary Examiner*—John Niebling
*Assistant Examiner*—Brendan Mee
*Attorney, Agent, or Firm*—Fitch, Even, Tabin & Flannery

[57] ABSTRACT

A method of producing potassium permanganate in an electrolytic cell is described where the cell is separated into a catholyte and anolyte region, potassium hydroxide is made in the catholyte region and is recycled back into upstream portions of the process to oxidize permanganate dioxide bearing ore.

9 Claims, 2 Drawing Sheets

ELECTROLYTIC PRODUCTION OF POTASSIUM PERMANGANATE USING A CATIONIC MEMBRANE IN AN ELECTROLYTIC CELL

BACKGROUND OF THE INVENTION

This invention relates to a method of producing potassium permanganate from manganese dioxide ore and removing impurities from potassium manganate produced from the manganese bearing ore and which manganate is a precursor to permanganate in the production of potassium permanganate. In particular, the invention involves the electrolytic production of permanganate from manganate where the cathode and anode of the electrolytic cell are separated by a cationic membrane which is permeable to monovalent cations and which is substantially impermeable to anions. This separation creates a catholytic region for the production and separation of potassium hydroxide from the anolytic solution and permits a return of potassium hydroxide to the upstream portion of the process directed to the treatment of the manganese dioxide ore and impure precursor manganate.

The manufacture of potassium permanganate ($KMnO_4$) from manganese dioxide ($MnO_2$) containing ore requires at least three steps which require considerable amounts of potassium hydroxide. The first of these steps involves the production of potassium manganate VI ($K_2MnO_4$) and may also involve the production of an intermediate potassium manganate V ($K_3MnO_4$) from the manganese dioxide ore. A second step which requires considerable amounts of aqueous potassium hydroxide is the leaching of the manganate from insoluble ore impurities to obtain a leach solution of manganate. Yet another step which requires aqueous potassium hydroxide as a solvent, is the electrolytic oxidation of the potassium manganate to potassium permanganate. The first and third of these steps are generally represented by the following reactions:

(1) $MnO_2 + 2KOH + \frac{1}{2}O_2 \rightarrow K_2MnO_4 + H_2O$ (2) $K_2MnO_4 + H_2O \text{-electrolysis} \rightarrow KMnO_4 + KOH + \frac{1}{2}H_2$ The step represented by equation 1 is a high temperature oxidation with air or other oxygen-containing gas to provide an ore oxidation product and is carried out in the presence of relatively concentrated potassium hydroxide solution, such as about 65% to about 90%. A number of methods are known for this oxidation step. It is known to roast a particulate mixture of manganese dioxide ore and potassium hydroxide. The mixture is roasted with air at about 225° C. while intermittently spraying water on the particulate mixture of solids. Another more preferable method is to add the particulate ore to a highly concentrated potassium hydroxide melt and introducing oxygen at elevated temperatures. This oxidation is described in U.S. Pat. Nos. 2,940,821, 2,940,822 and 2,940,823 which patents are fully incorporated by reference as if fully rewritten herein.

After the initial conversion of manganese dioxide to crude potassium manganate which also contains insoluble solids from the ore, the impure potassium manganate is dissolved or leached from the ore oxidation product with dilute aqueous solution of potassium hydroxide to form a manganate leach solution. Again potassium hydroxide is a necessary element in the purification of the manganate and ultimate production of the permanganate.

Equation 2 represents the electrolytic production of permanganate [Fin(VII)] from manganate [Mn(VI)]. While the electrolytic production of permanganate from manganate has been known for a long time, that electrolysis involves a number of known desired main reactions and also side reactions at the cathode and anode where the side reactions at minimum have to be controlled for the economic production of permanganate. The reaction in the electrolytic cell include:

At the anode
Main reaction: $MnO_4^{2-} - e \rightarrow MnO_4^-$
Side reaction: $2OH^- - 2e \rightarrow H_2O + \frac{1}{2}O_2$
At the cathode
Main reaction: $H_2O + e \rightarrow \frac{1}{2}H_2 + OH^-$
Side reaction: $MnO_4^- + e \rightarrow MnO_4^{2-}$
Side reaction: $MnO_4^{2-} + e \rightarrow MnO_4^{3-}$ which partly hydrolyzes to $MnO_2$.

In prior electrolytic processes for the production of potassium permanganate, potassium permanganate is obtained in the form of crystals from a concentrated aqueous mother liquor. That aqueous mother liquor is a saturated solution of potassium permanganate which also contains relatively large amount of potassium hydroxide as well as alkali soluble impurities. These impurities are predominately potassium carbonate as well as lesser amounts of potassium silicates, aluminates, phosphates, etc. Prior art processes recognized the need for recirculation and conservation of potassium hydroxide used throughout the process of making potassium permanganate.

It is known that in the industrial production of potassium permanganate that only about 40% of the potassium hydroxide in the process streams is actually used to form the end product potassium permanganate. The remaining 60% of the potassium hydroxide is carried through the process in an aqueous solution as a reaction medium. The reuse of this large excess of potassium hydroxide is an important economic factor in the production of potassium permanganate.

As described in U.S. Pat. No. 3,172,830 to Carus, which is incorporated by reference as if fully rewritten herein, the potassium or alkali impurities in the aqueous mother liquor resulting after crystallization of the permanganate from the electrolytic cell can be causticized into potassium hydroxide using $Ca(OH)_2$ or $CaO$ by the reaction $K_2CO_3 + Ca(OH)_2 \rightarrow 2KOH + CaCO_3$. This "causticization" conserves potassium hydroxide for reuse in the process such as in the leaching step. At least part of the mother liquor is concentrated to conserve potassium hydroxide for use in the initial oxidation of the manganese dioxide ore. That evaporation is energy intensive.

It is an object of the invention to provide for an improved process for the production of potassium permanganate from manganese dioxide containing ore, particularly as a continuous process.

It is another object of the invention to conserve manganese dioxide ore, electricity and potassium hydroxide in the electrolytic production of potassium permanganate.

It is yet another object of the invention to provide for a process for the production of potassium permanganate from manganese dioxide containing ore using potassium hydroxide to produce a manganate intermediate; and further to purify the manganate intermediate prior to electrolysis where potassium hydroxide (1) is made and collected in a catholytic region of an electrolytic cell and (2) is returned for use in the production of the manganate intermediate.

It is yet another object of the invention to use a cationic membrane not only to conserve raw materials in the electrolytic production of potassium permanganate, but also to minimize undesired side reactions in the electrolytic cell to increase the efficiency in the production of permanganate.

Yet another object of the invention is to inhibit the dangerous and potentially explosive mixing of oxygen and hydrogen gases which may be produced during the electrolysis process.

These and other objects of the invention will be recognized after review of the following description and summary of the invention.

SUMMARY OF THE INVENTION

Figure 1:
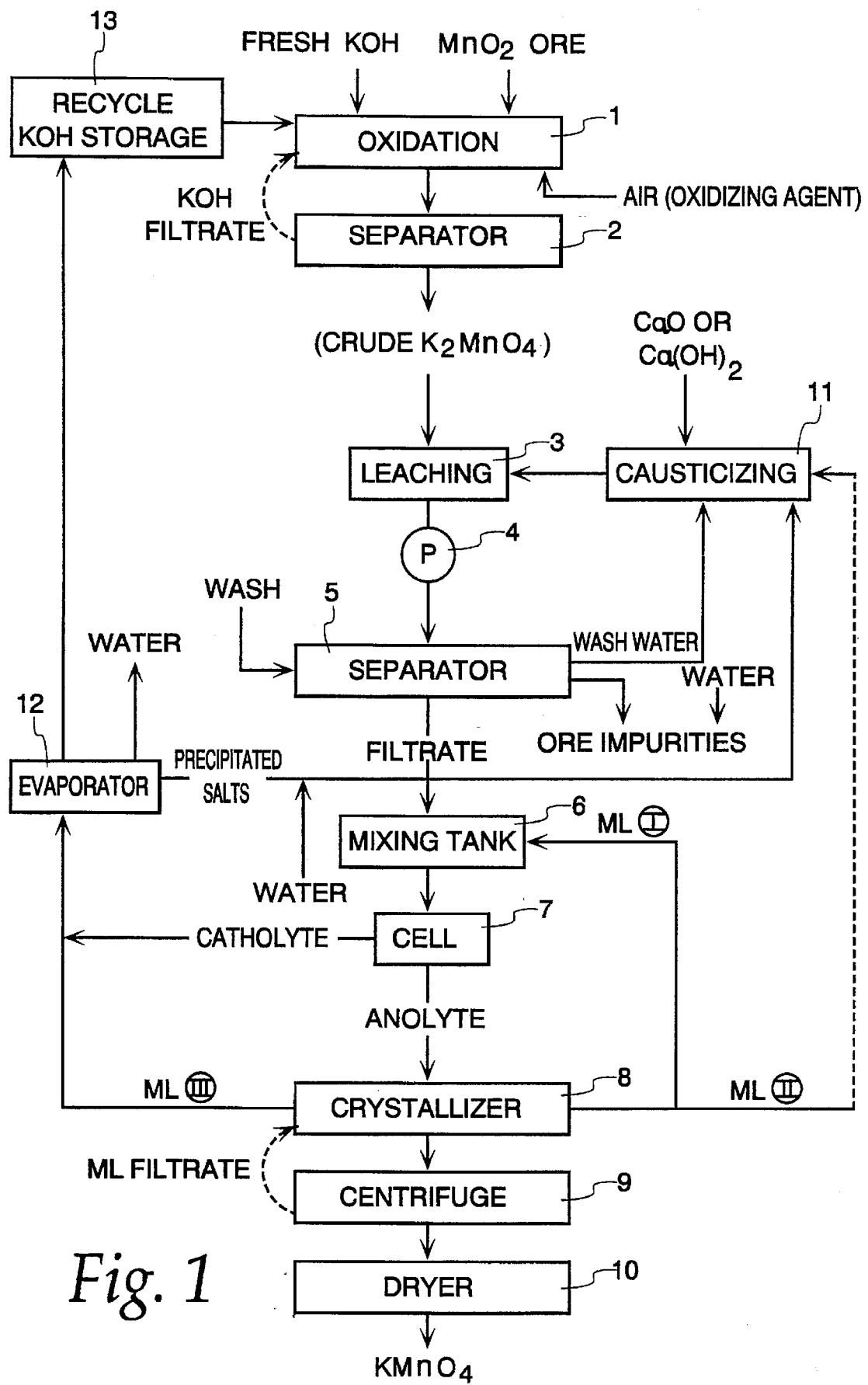
FIG. 1 is a flow sheet illustrating the process.

According to the invention, manganese dioxide containing ore is oxidized with a potassium hydroxide feed solution and oxygen to obtain an impure manganate mixture which is a crude slurry of precipitated potassium manganate. That slurry contains impurities in solution and suspended solids. The impure solid potassium manganate, as part of the impure manganate mixture, is leached to provide a manganate leach solution. Ore impurities remain undissolved and the manganate is in solution. The solid impurities are separated from the manganate leach solution, such as by filtration or centrifugation. The leach solution, which includes potassium hydroxide as a solvent, is fed to an electrolysis solution to an electrolysis cell where the cathode and anode are separated by a cationic membrane. The presence of an effective amount of KOH is necessary to form a stable solution of $K_2MnO_4$.

The cationic membrane is permeable to cations and is generally impermeable to anions. During the electrolysis to convert manganate into permanganate, potassium hydroxide is made at the cathode in a catholytic region and the potassium hydroxide is concentrated in that region between the cathode and the cationic membrane. Manganate is converted to permanganate at the anode, the manganate, permanganate and other constituents in the leachate being isolated between the anode and the cationic membrane which is the anolyte region of the cell. The potassium hydroxide is withdrawn from the catholytic region of the cell and is eventually returned to the upstream portion of the process. The potassium hydroxide may be recycled to become part of the potassium hydroxide feed solution which is used to oxidize the manganese dioxide ore. Permanganate is generated in the anolyte region of the cell. In an important aspect of the invention, however, the permanganate from the anolytic region flows into a crystallizer where permanganate is crystallized and separated from impurities such as potassium sulfate, potassium chloride, metal ions, which metal ions include cobalt, nickel, copper, as well as silicates and aluminares which include zeolites.

In a particularly important aspect of the invention the potassium permanganate is continuously produced in a cell as generally described in U.S. Pat. Nos. 2,843,537; 2,908,620; and 3,062,734 which are incorporated by reference as if fully rewritten herein. The latter patents describe a "Carus" cell which is a continuous flow through electrolyzer. It has a rectangular bipolar electrode where the anode is an open monel electrode attached to the steel cathode by a series of conductive baffles. The cell may have up to about 100 electrodes which are mounted vertically.

The cationic membrane in the cell of this invention is in a plane generally parallel to the anode and cathode creating the catholytic and anolytic region as described herein.

By isolating the anolyte from the catholyte, the cationic membrane (1) permits the production and concentration of valuable potassium hydroxide in the catholyte and permits the return of that potassium hydroxide to the upstream portion of the process, (2) prohibits or at least substantially inhibits the movement of permanganate ions to the cathode to avoid conversion of permanganate to undesired manganate, (3) inhibits the potentially explosive mixing and contact of oxygen formed at the anode with hydrogen formed at the cathode, (4) permits the reduction of the distance between the cathode and the anode to permit the running of the process at reduced voltages, and hence, reduced power costs, and (5) permits an increased cathode area which results in lower overvoltages required to run the process, and (6) reduces undesirable side reactions in the anolyte region because the potassium hydroxide generated in the catholyte region is kept separate from the anode.

DESCRIPTION OF THE PREFERRED EMBODIMENTS

In the flow diagram of FIG. 1, the overall process is substantially continuous and is readily adapted to automatic control. The first step of the process is represented by oxidation of a manganese oxide ore in a suitable reaction vessel 1 or series of vessels, preferably by a liquid phase oxidation carried out in a highly concentrated 65 to 90% (by weight) potassium hydroxide melt. Air or some other oxygen-containing gas is supplied for this oxidation, and both fresh and recycle KOH may be introduced and adjusted to the desired concentration. The $K_2MnO_4$ reaction product precipitates and forms a crude solid slurry of potassium manganate which can be transferred to the separator 2 to recover the crude solid product containing potassium manganate.

At the high KOH concentrations employed in a liquid phase oxidation, the $K_2MnO_4$ is relatively insoluble as are many impurities such as $K_2CO_3$ and the like. Therefore, the $K_2MnO_4$ product is not in pure form but contains those impurities in dilute KOH solutions which are "alkali-soluble," i.e. potassium carbonate and also such minor impurities as the silicates, aluminates and/or phosphates of potassium; and further such trace elements such as Cu, Pb, Ni and Co. In addition, there is normally present a lesser amount of practically insoluble impurities or by-products derived from a minor ore content of elements such as iron, calcium, magnesium, or barium. These insoluble materials are hereinafter referred to as "ore impurities."

With the liquid phase oxidation in vessel 1, it is usually necessary to separate the concentrated KOH solution from the solid product, and this solution may then be recycled to the liquid phase oxidation as indicated. Where the ore is roasted in an almost dry state, it will be understood that the resulting product is relatively dry and usually does not require such additional treatment.

The impure $K_2MnO_4$ product is combined with the leachate in which the manganate and impurities such as potassium carbonate are dissolved or leached from the ore impurities while the ore impurities remain undissolved. This step is carried out in a suitable mixing tank 3 by addition of a diluted and causticized mother liquor from heated vessel 11. Potassium hydroxide from the catholytic region of electrolysis cell 7 also may be used in this step, if desired. The mother liquor and/or potassium hydroxide employed for leaching is discussed more fully below, but with reference to the leaching step, the potassium hydroxide solution is prepared to provide 30–120 grams per liter, and likely 60–100 grams per liter of KOH after leaching. The crude $K_2MnO_4$ product is added to this mother liquor and/or KOH solution in order to obtain a $K_2MnO_4$ concentration of about 100–200 grams per liter. Leaching of the crude $K_2MnO_4$ can be carried out at a temperature of about 45°–95° C.

The leach solution is conducted from vessel 3 by means of a suitable pump 4 into a separator (such as a filter) or a series of separators 5 for removal of all solid impurities including those which are produced during causticization of the mother liquor. If a single separator is employed, the leach filtrate solution containing the dissolved $K_2MnO_4$ should be collected separately from wash water in order to provide better control over the concentration of dissolved substances. Separate filtrates can also be easily obtained by employing a series of two or more separators in a conventional manner. The filtrate from separator 5 as leach solution is conducted to mixing tank 6 in which the concentration of the various ingredients can be accurately adjusted for optimum results during electrolysis. The solids from filter 5 are washed and discarded, and the wash water is preferably recovered for use in causticization. The solid impurities from separator 5 consist primarily of $CaCO_3$, excess $Ca(OH)_2$ and the insoluble ore impurities. Substantially all of the other alkali insoluble impurities, e.g. calcium silicates, are also removed at this point.

In mixing tank 6, the leach solution is preferably diluted with at least a portion of the mother liquor ML-I and precipitated salts can also be added from an evaporator 12. If necessary, additional water can be added at this point. However, additional quantities of water are desirably kept to a minimum in order to avoid excessive evaporation costs. The mixing in tank 6, to provide an electrolysis solution, should be carried out such that the resulting solution has a KOH concentration of about 80–190 grams per liter, and a $K_2MnO_4$ concentration of about 10–50 grams per liter. The amount of $KMnO_4$ in this solution is kept as low as possible, preferably less than 20 grams per liter. Likewise, the amount of alkali soluble impurities such as $K_2CO_2$ should be reduced to a minimum to avoid poor yields during electrolysis and an impure product.

The electrolysis solution from mixing tank 6 then is pumped into the electrolytic cell 7 for oxidation of $K_2MnO_4$ into $KMnO_4$ at a temperature of about 55° C. Since the crystallization is usually carried out at temperatures somewhat lower than the electrolytic oxidation, it is generally advisable to provide some means for heating tank 6, for example by indirect heat exchange or by introducing live steam into the mixture.

The construction and operation of a known electrolysis cell 7 are described in detail in U.S. Pat. No. 2,843,537, No. 2,908,620 and 3,062,734. It is important to avoid precipitation or crystallization of potassium permanganate or impurities within the cell itself since this would cause a rapid decrease in the capacity and efficiency of the cell. In this respect, such undesirable precipitation will increase with increasing amounts of alkali-insoluble impurities present within the cell so that the throughput during electrolytic oxidation is strongly influenced by the manner in which impurities are removed from the overall process.

Figures 2, 3:
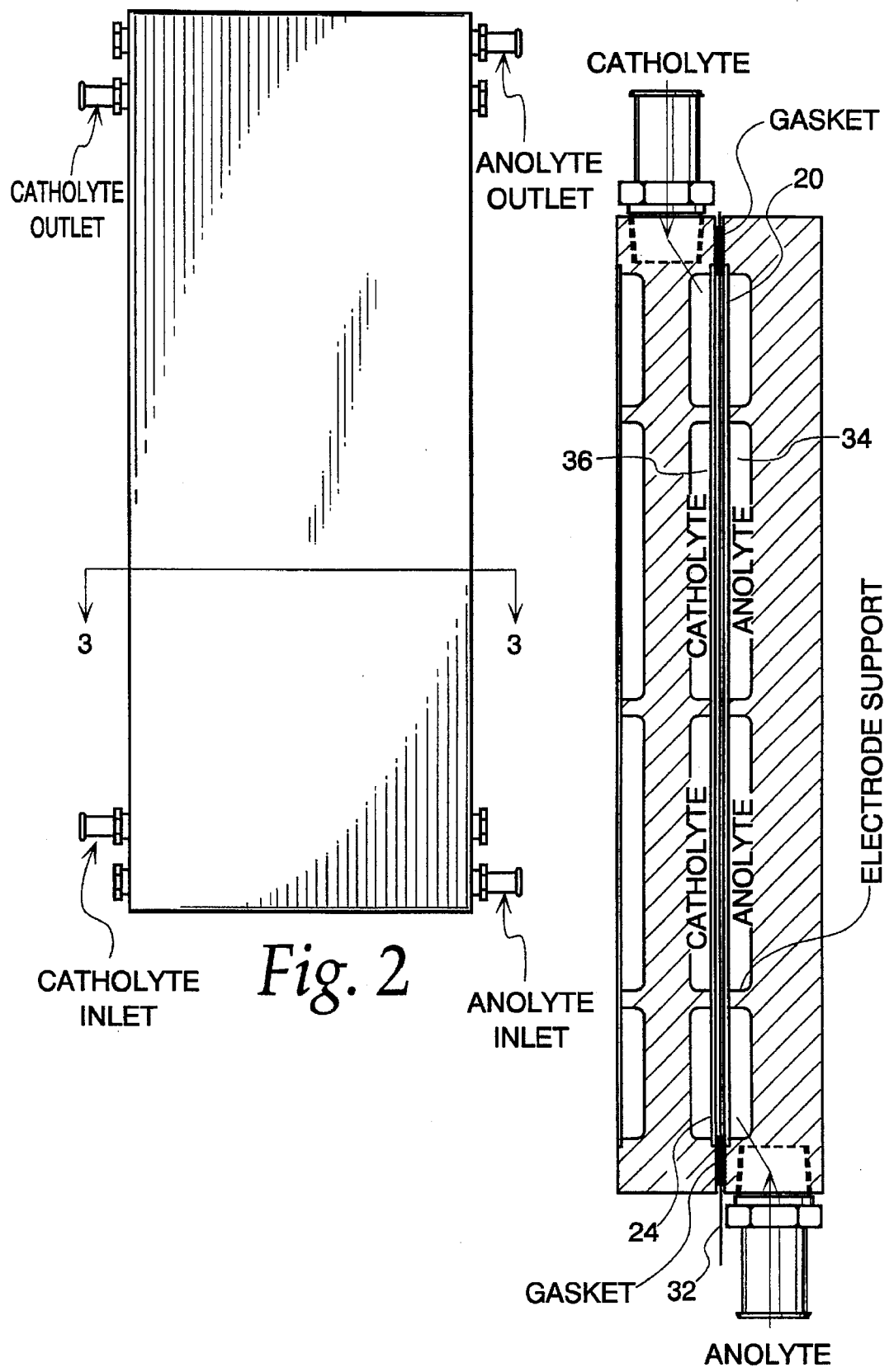
FIG. 2 is a side view of the electrolytic cell illustrating a catholytic and anolytic regions.
FIG. 3 is a top view illustrating the flow of the catholyte and anolyte through the cell.

An expanded simplified view of an electrolytic cell having a continuous electrolytic flow is shown in FIG. 3. The cell has a bipolar electrode with an open monel anode 20 attached to a steel cathode 24. The interconnections are gasketed to prevent migration of solution from one region to the other. A cationic membrane 32 extends between and separates the anode and the cathode and creates an anolyte region 34 and catholyte region 36.

A cationic membrane with adequate chemical and mechanical integrity to withstand the conditions of the cell may be used. The cationic membrane may be a perfluorinated membrane, and in an important aspect, a perfluorosulfonate membrane which is based upon a copolymer of tetrafluoroethylene and a perfluorovinyl ether containing a terminal sulfonyl group. In a very important aspect, the latter polymer is cast on an inert cloth such as polytetrafluoroethylene, which is commonly sold under the mark Teflon, which a trademark of Dupont Chemical Company. Membranes which may be used in the invention are commercially sold under the mark Nafion by Dupont Chemical Company. Generally, reinforcement of these membranes, as previously described, is necessary due to the fragility of the membranes, the nature of the process, and the highly oxidative nature of the chemicals in the process. The thickness of the reinforced membranes is in the range of from about 0.1 to about 1 mm. The membrane is permeable to monovalent cations and is substantially impermeable to anions. In this connection substantially impermeable means >80% permselectivity in 0.5 to 0.6N NaCl. The membrane separates the cathode and anode which are separated by a distance in the range of from about 0.250" to about 0.300" with the membrane being about one half way between the cathode and the anode.

Cationic membranes can swell considerably. The membrane should be pretreated to ensure that it will not be loose in the cell frame between the electrodes. Swelling is influenced by temperature and time of immersion, the cation form of membrane and caustic concentration in the electrolyte. Membrane expansion occurs as temperature increases. Immersion of the membrane in an aqueous solution for 30 minutes is usually adequate to complete expansion, but this length of time is dependent upon membrane type and ions in solution. NE 450 and N 417 are sold with $H^+$ cation, but NE 430 is sold with $K^+$ cation. The $H^+$ membranes are pretreated by immersion in a boiling, aqueous solution of NaOH or KOH. These membranes shrink when they are converted from the $H^+$ form to the $K^+$ or $Na^+$ form. Finally, membrane shrinkage increases as the caustic concentration increases in the electrolyte.

The cathode current density is in the range of 500 to about 1500 A/M² assuming a flat electrode. The voltage across the cell is determined by the current density and cell resistance. For each cell it is in the range of from about 2.0 to about 3.5.

Because the membrane is permeable to monovalent cations, potassium cations $K^+$ go through the membrane toward the cathode and potassium hydroxide is made and collected in the catholyte region of the cell. The concentration of potassium hydroxide in the catholyte region will be in the range of from about 15 to about 35 weight percent, preferably toward the higher end. Because the membrane is substantially impermeable to anions, the membrane will collect and concentrate permanganate in the anolyte region and discourage the reduction of permanganate to manganate at the cathode. The membrane also causes the separation of hydrogen made at the catholyte from the oxygen made in the anolyte and reduces the amount of impurities recirculated in the system as compared to the prior art processes when the potassium hydroxide created is mixed with the mother liquor.

The product solution from the anolyte region of the electrolytic cell 7 is fed into a crystallizer 8 for cooling and crystallization of $KMnO_4$ product. A slurry of the crystalline product in the mother liquor can be continuously removed from the crystallizer and passed through a centrifuge 9 or similar means for filtering or separating the crystals while returning mother liquor (ML flitrate) to the crystallizer. The crystals are then dried in dryer 10 to obtain the $KMnO_4$ product.

The crystallizer 8 is also preferably constructed and operated as disclosed in U.S. Pat. Nos. 2,843,537 and No. 2,908,620, wherein the hot solution from cell 7 is first led into a gas separator and then pumped upwardly through a riser connected to the crystallization vessel. Cooling of the hot product solution produces a state of supersaturation of the $KMnO_4$ in the solution which is then released as $KMnO_4$ crystals. Nuclei or small crystals of $KMnO_4$ are always present in the main body of mother liquor in the crystallizer, upon which nuclei further crystal formation can take place. Larger crystals will settle to the bottom of the crystallizer for removal as a slurry while recycle mother liquor can be withdrawn near the top or surface of the liquid in the crystallizer. The mother liquor in the crystallizer is cooled to a temperature of about 50° to 30° C.

The mother liquor being withdrawn from the crystallizer as a recycle stream will vary in its composition within certain limits, depending upon a number of different factors including the proportions of reactants introduced into the electrolytic cell, the efficiency of the cell itself, the potassium hydroxide concentration and temperature of the solution, the amount of alkali-insoluble impurities which are permitted to accumulate and the amount of $KMnO_4$ which is effectively crystallized and separated from the mother liquor. Of course, it is desirable to separate and recover as much of the potassium permanganate as possible from the crystallizer, but as a practical consideration it is impossible and not necessarily desirable to completely free the mother liquor of potassium permanganate. Thus, it is advantageous to recycle small amounts of $KMnO_4$ to various stages of the process, e.g. as an aid in preventing hydrolysis of $K_2MnO_4$. Primary consideration is therefore given to operation of the crystallizer so as to obtain a maximum recovery of potassium permanganate without precipitating any other solids, including impurities, thereby avoiding complicated or extensive steps for purifying the separated product. In other words, purification of the potassium permanganate is substantially complete after crystallizing and centrifuging this product from the mother liquor.

In the normal operation of the electrolytic oxidation of the crude $K_2MnO_4$ which has been leached into a potassium hydroxide solution, and in accordance with this invention, the mother liquor withdrawn from the crystallizer for recycle purposes may have approximately the following composition:

|  | Concentration, grams per liter | |
| --- | --- | --- |
|  | Broad Range | Likely Range |
| KOH | 100–200 | 125–175 |
| $K_2MnO_4$ | 10–65 | 10–25 |
| $KMnO_4$ | 10–30 | 15–20 |
| Soluble impurities | 30–40 | 45–75 |

It should be recognized, of course, that these values of concentration are taken after an approximate equilibrium has been reached during continuous operation. The amounts of KOH, $K_2MnO_4$ and $KMnO_4$ are relatively stable and essentially determined by the efficient operation of the cell and crystallizer whereas there may be a greater fluctuation in the amount of alkali-soluble impurities, such as potassium carbonate and the potassium silicates, aluminates and phosphates, etc. because of the quantity of the manganese oxide ore being introduced into the process. The KOH concentration in the mother liquor is reduced compared to the known prior art processes by virtue of making and concentration of KOH in the catholyte.

The recycled mother liquor is preferably separated into three streams, one portion ML-I being recycled from the crystallizer 8 directly to the mixing tank 6 for adjustment of the aqueous mixture just prior to electrolysis. A second portion of the mother liquor ML-II may be recycled for causticization in vessel 11 and employed for leaching in vessel 3 as discussed more fully below. The third portion of the mother liquor ML-III is recycled to an evaporator 12 where sufficient water is taken off in order to precipitate the so-called "evaporator salts" in conventional manner. These precipitated salts may be returned to the causticizing tank 11 directly or after being redissolved. Any resulting concentrated KOH solution which was not produced and separated in the electrolysis cell can then be reused in the process, preferably by recycle to the first stage oxidation of the manganese oxide ore where it can be temporarily stored in any suitable vessel 13 or for use in the leaching of the manganate in the leaching vessel 3.

It will be recognized that by splitting the recycle mother liquor into three separate recycle streams, there is a high degree of flexibility in operating the overall process under optimum conditions. More importantly, the level of impurities in the system can be carefully regulated by causticizing the second stream ML-II such that alkali-soluble impurities are converted into potassium hydroxide. The proportions into which the mother liquor is separated into three recycle streams is best determined during actual operation of the process based upon a continuous analysis of the impurity level and the KOH concentration for leaching. It is desirable to reduce the amount of mother liquor recycled to the evaporator 12 to a minimum in order to avoid excessive evaporation costs.

The operation of the recycle system can be such that all of the mother liquor from crystallizer 8 is first recycled without any treatment, as represented by ML-I, to the mixing tank 6 until the impurity level reaches a maximum permissible value. The causticizing stream ML-II and/or the evaporation stream ML-III can then be operated intermittently to the extent that the impurity level must again be reduced and to the extent that the use of KOH produced in the catholytic region of the cell may be used in the leaching and the causticization process. Alternatively, it is preferred to carry out the entire process continuously under equilibrium conditions so as to maintain a relatively even level of impurities within prescribed limits and to continuously replenish the supply of concentrated KOH solution from the cell free of impurities. This alternative procedure permits a more accurate control of the process and avoids difficulties in adjusting the solution concentration for electrolysis. When operating under such equilibrium conditions, the recycle mother liquor is advantageously proportioned into the three separate streams about as follows:

|  | Percent by volume |
| --- | --- |
| ML-I (direct recycle | 85% |
| ML-II (causticizing recycle | 5% |
| ML-III (evaporating recycle) | 10% |

The product solution from the catholytic region of the cell has a potassium hydroxide concentration of from about 20 to about 35%, which is at least about 20% higher than in prior art continuous processes. The use of the recycle stream of KOH from the anolyte region of the cell and its subsequent reintroduction into the process as a leaching medium and KOH feed solution are essential improvements of this invention and are carried out in the following manner.

The KOH created in the catholyte is further concentrated with a combination of recycled anolyte or independently in the evaporator system. The resulting concentrated KOH is transferred to the oxidizer 1.

What is claimed is:

1. A method for making potassium permanganate from manganese dioxide ore, the method comprising:

mixing the ore, potassium hydroxide and oxygen in an ore oxidation region to oxidize manganese in the ore to obtain an impure manganate mixture;

mixing the impure manganate mixture and potassium hydroxide to leach the potassium manganate from the impure manganate mixture in a manganate leach region to obtain a leach solution of potassium manganate;

electrolyzing an electrolysis solution in a electrolytic cell, the electrolysis solution comprising the leach solution of potassium manganate, the electrolytic cell including a cathode and anode, a cationic membrane separating the cell into a catholyte region and anolyte region;

converting the manganate in the leach solution to permanganate in the anolyte region of the electrolytic cell;

making potassium hydroxide in the catholyte region of the electrolytic cell;

crystallizing the permanganate from the anolyte region as potassium permanganate; and returning the potassium hydroxide made in the catholyte region of the electrolytic cell to the ore oxidation region or manganate leach region.

2. A method as recited in claim 1 wherein the concentration of potassium hydroxide in the catholyte region of the electrolytic cell is at least 20 weight percent more than the concentration of potassium hydroxide in the anolyte region.

3. A method as recited in claim 1 wherein the electrolysis solution is continuously fed into the electrolytic cell and the permanganate in the anolyte region and the potassium hydroxide in the catholyte region is continuously produced and withdrawn from the electrolytic cell in a continuous process.

4. A method as recited in claim 1 wherein the concentration of potassium hydroxide in the catholyte region of the electrolytic cell is in the range of from about 20 to about 35 weight percent.

5. A method as recited in claim 1 wherein the membrane is reinforced with polytetrafluoroethylene.

6. A method as recited in claims 1 or 5 wherein the membrane is a perfluorosulfonate membrane.

7. A method as recited in claims 1 or 5 wherein the membrane is a perfluorosulfonate membrane which is copolymer of tetrafluoroethylene and perfluorinated vinyl ether which has sulfonyl fluoride groups, the sulfonyl fluoride groups being converted to sulfonate groups.

8. A method as recited in claims 1 wherein the potassium hydroxide made in the catholyte region of the electrolytic cell is returned to the ore oxidation region.

9. A method as recited in claims 1 wherein the potassium hydroxide made in the catholyte region of the electrolytic cell is returned to the manganate leach region.

* * * * *

UNITED STATES PATENT AND TRADEMARK OFFICE
CERTIFICATE OF CORRECTION

PATENT NO. : 5,660,712
DATED : August 26, 1997
INVENTOR(S) : Carus, III et al.

It is certified that error appears in the above-identified patent and that said Letters Patent is hereby corrected as shown below:

IN THE ABSTRACT:

Line 5, after the word "oxidize" and before the word "dioxide", delete "permanganate" and insert -manganese-.

Signed and Sealed this

Twenty-first Day of July, 1998

Attest:

BRUCE LEHMAN

Attesting Officer      Commissioner of Patents and Trademarks